United States Patent [19]

Maki et al.

[11] Patent Number: 5,307,261
[45] Date of Patent: Apr. 26, 1994

[54] METHOD AND SYSTEM FOR PRODUCT CONFIGURATION MANAGEMENT IN A COMPUTER BASED MANUFACTURING SYSTEM

[75] Inventors: Reino A. Maki, Marietta; Herman Mitchell, Lithonia; Sujan K. Mukherjee, Roswell; Badari N. Panuganti, Mableton; April D. E. Stiles, Atlanta, all of Ga.

[73] Assignee: International Business Machines Corporation, Armonk, N.Y.

[21] Appl. No.: 723,478

[22] Filed: Jun. 28, 1991

[51] Int. Cl.[5] .......................... G06F 7/00; G06F 9/00; G06F 15/00
[52] U.S. Cl. ................................... 364/401; 364/402; 364/403
[58] Field of Search ................. 364/401, 402, 403, 468

[56] References Cited

U.S. PATENT DOCUMENTS

| | | | |
|---|---|---|---|
| 4,831,582 | 5/1989 | Miller et al. | 364/900 |
| 4,875,162 | 10/1989 | Ferriter et al. | 364/401 |
| 5,119,307 | 6/1992 | Blaha et al. | 364/468 |

OTHER PUBLICATIONS

W. C. Stetler, Technical Disclosure Bulletin, Dec. 1989, vol. 32, No. 7, "Self-Describing File Vintage for Hardware System Design Files".

R. Y. Tsai, Technical Disclosure Bulletin, Mar. 1985, vol. 27, No. 10A, "Three-Dimensional Mechanical Part Measurement Using a Vision/Robot System".

Primary Examiner—Roy Envall, Jr.
Assistant Examiner—Ari M. Bai
Attorney, Agent, or Firm—Andrew J. Dillon

[57] ABSTRACT

The invention creates a number of End Item Configuration lists, each End Item Configuration list including a listing of those custom components and variations of standard components which are utilized for a selected configuration of a complex product. A basic bill of materials is also created including a listing of those standard components utilized for all configurations of the complex product. Thereafter, a relationship is established between a particular End Item Configuration list and a customer contract for the manufacture of a selected configuration of a complex product. Based upon the established relationship, a selected one of the End Item Configuration lists is retrieved and combined with a basic bill of materials to create a complete bill of material utilizing both the End Item Configuration list and the basic bill of materials, which may then be utilized in the manufacture of a particular configuration of a complex product. A unique End Item Configuration identifier is established for each configuration of the complex product and is then utilized to maintain an engineering change history associated with each unique End Item Configuration independent of engineering change histories associated with other configurations for the complex product. In this manner, the configuration data utilized to create a bill of material explosion may be stored in a nonredundant manner independently of the configuration which utilizes that data. In this manner, the End Item Configuration list feature may be added to existing bill of material systems without requiring a redesign of such systems.

8 Claims, 12 Drawing Sheets

SAMPLE EFFECTIVITY TYPE CODES

| FIRST CHARACTER | | SECOND CHARACTER | |
|---|---|---|---|
| CODE | MEANING | CODE | MEANING |
| D | DATE | T | TIME ORIENTED EFFECTIVITY |
| S | SERIAL NUMBER | C | CEI CONFIGURATION EFFECTIVITY (CANNOT BE USED FOR DATE EFFECTIVITY) |
| B | BATCH NUMBER | | |
| L | LOT NUMBER | | |

*Fig. 3*

PRODUCT CONFIGURATION IDENTIFICATION

ENGINEERING CHANGE NOTICE – ECA

END ITEM P1 IS DEFINED AS A GENERIC END ITEM CONSISTING OF A BASIC ASSEMBLY A AND MAKE-TO-ORDER COMPONENTS B, C, AND D.

BILL OF MATERIAL

| ITEM ID. | CUSTOM VARIATION-ID. | DESIGN SEQUENCE INSERT | DESIGN SEQUENCE EXTRACT | COMPONENT ID. | COMPONENT SEQUENCE | QUANTITY PER ASSEMBLY | ITEM FEATURE CODE | COMPONENT POSITION ID. |
|---|---|---|---|---|---|---|---|---|
| P1 | | 8001 | | A | 1 | 1 | STANDARD | 1 |
| P1 | | 8001 | | B | 1 | 1 | OPTIONAL | 2 |
| P1 | | 8001 | | C | 1 | 1 | OPTIONAL | 3 |
| P1 | | 8001 | | D | 1 | 1 | OPTIONAL | 4 |

ENGINEERING CHANGE NOTICE – ECB

CUSTOMER ABC ORDERED 5 UNITS OF END ITEM P1 WITH BASIC ASSEMBLY A AND MTO COMPONENTS B AND D. THE END ITEM CONFIGURATION IS ASSIGNED 'CONF1' IDENTIFIER AND SERIAL NUMBERS 121 THROUGH 125. THE CONTRACT SPECIFIES A MODIFICATION TO BASIC ASSEMBLY A WHICH IS ASSIGNED AN ITEM CUSTOM VARIATION IDENTIFIER 'VAR1'.

END ITEM CONFIGURATION – CUSTOM ITEMS

| END ITEM | | | | CUSTOM ITEM | | |
|---|---|---|---|---|---|---|
| ITEM ID. | CONFIG-URATION | INSERT SEQ. | EXTRACT SEQ. | ITEM ID. | VARIATION ID. | EC ID. |
| P1 | CONF1 | 8002 | | A | VAR1 | ECB |

CONTRACT END ITEM – CONFIGURATION & EFFECTIVITY

| CONTRACT ID. | CONTRACT LINE NUMBER | END ITEM ID. | END ITEM CONFIGURATION ID. | SERIAL NO. START | SERIAL NO. END |
|---|---|---|---|---|---|
| ABC_1 | 1 | P1 | CONF1 | 121 | 125 |

Fig. 7

ENGINEERING CHANGE NOTICE - ECA

PURPOSE: INITIALLY DEFINE THE BILL OF MATERIAL FOR ASSEMBLY A
TO BE USED IN THE BASIC END ITEM P1 SERIAL NUMBERS
1 THROUGH 999. ASSEMBLY A HAS THE FOLLOWING
COMPONENTS:
        COMPONENT E - QUANTITY 2
        COMPONENT F - QUANTITY 1

EC AFFECTED ITEM

| EC ID. | ITEM ID. | CUSTOM VARIATION ID. | CONFIG-URATION ID. | DESIGN SEQUENCE NUMBER | DISPOSITION | | EFFEC-TIVITY TYPE | END ITEM ID. | SERIAL START NUMBER |
|---|---|---|---|---|---|---|---|---|---|
| | | | | | CODE | QTY. | | | |
| ECA | A | | | 8001 | | | ST | P1 | 001 |

BILL OF MATERIAL

| ITEM ID. | CUSTOM VARIATION ID. | DESIGN SEQUENCE | | COMPONENT | | QUANTITY PER ASSEMBLY | ITEM FEATURE CODE | COMPONENT POSITION ID. |
|---|---|---|---|---|---|---|---|---|
| | | INSERT | EXTRACT | ID. | SEQUENCE | | | |
| A | | 8001 | | E | 1 | 2 | STANDARD | 1 |
| A | | 8001 | | F | 1 | 1 | STANDARD | 2 |

Fig. 8

ENGINEERING CHANGE NOTICE – ECB

PURPOSE: MODIFY THE BILL OF MATERIAL FOR ASSEMBLY A FOR CUSTOM VARIATION 'VAR1' OF ITEM A AS PER CUSTOMER ABC CONTRACT ABC-1 SPECIFICATIONS. BASIC COMPONENT F IS REPLACED BY COMPONENTS Y AND Z WITH QUANTITY OF 1 EACH. ALSO USE ECB FOR END ITEM P1 CONFIGURATION 'CONF1'.

EC AFFECTED ITEM

| EC ID. | ITEM ID. | CUSTOM VARIATION ID. | CONFIGURATION ID. | DESIGN SEQUENCE NUMBER | DISPOSITION | | EFFECTIVITY TYPE | END ITEM ID. | SERIAL START NUMBER |
|---|---|---|---|---|---|---|---|---|---|
| | | | | | CODE | QTY. | | | |
| ECA | P1 | | | 8001 | | | ST | P1 | 001 |
| ECA | A | | | 8001 | | | ST | P1 | 001 |
| ECB | P1 | | CONF1 | 8002 | | | SC | P1 | 121 |
| ECB | A | VAR1 | | 8002 | | | SC | P1 | 121 |

BILL OF MATERIAL

| ITEM ID. | CUSTOM VARIATION ID. | DESIGN SEQUENCE | | COMPONENT | | QUANTITY PER ASSEMBLY | ITEM FEATURE CODE | COMPONENT POSITION ID. |
|---|---|---|---|---|---|---|---|---|
| | | INSERT | EXTRACT | ID. | SEQUENCE | | | |
| A | | 8001 | | E | 1 | 2 | STANDARD | 1 |
| A | | 8001 | | F | 1 | 1 | STANDARD | 2 |
| A | VAR1 | 8002 | | E | 2 | 2 | STANDARD | 1 |
| A | VAR1 | 8002 | | Y | 1 | 1 | STANDARD | 2 |
| A | VAR1 | 8002 | | Z | 1 | 1 | STANDARD | 2 |

*Fig. 9*

ENGINEERING CHANGE NOTICE - ECC

PURPOSE: MODIFY THE BILL OF MATERIAL FOR ASSEMBLY A FOR THE BASIC END ITEM P1 SERIAL NUMBERS 131 THROUGH 999... REPLACE BASIC COMPONENT E BY COMPONENT G, QUANTITY 2.

EC AFFECTED ITEM

| EC ID. | ITEM ID. | CUSTOM VARIATION ID. | CONFIGURATION ID. | DESIGN SEQUENCE NUMBER | DISPOSITION CODE | DISPOSITION QTY. | EFFECTIVITY TYPE | END ITEM ID. | SERIAL START NUMBER |
|---|---|---|---|---|---|---|---|---|---|
| ECA | P1 |      |       | 8001 | | | ST | P1 | 001 |
| ECA | A  |      |       | 8001 | | | ST | P1 | 001 |
| ECB | P1 |      |       | 8002 | | | SC | P1 | 121 |
| ECB | A  | VAR1 | CONF1 | 8002 | | | SC | P1 | 121 |
| ECC | A  |      |       | 8003 | | | ST | P1 | 131 |

BILL OF MATERIAL

| ITEM ID. | CUSTOM VARIATION ID. | DESIGN SEQUENCE INSERT | DESIGN SEQUENCE EXTRACT | COMPONENT ID. | COMPONENT SEQUENCE | QUANTITY PER ASSEMBLY | ITEM FEATURE CODE | COMPONENT POSITION ID. |
|---|---|---|---|---|---|---|---|---|
| A |      | 8001 | 8003 | E | 1 | 2 | STANDARD | 1 |
| A |      | 8001 |      | F | 1 | 2 | STANDARD | 2 |
| A | VAR1 | 8002 |      | E | 2 | 2 | STANDARD | 1 |
| A | VAR1 | 8002 |      | Y | 1 | 1 | STANDARD | 2 |
| A | VAR1 | 8002 |      | Z | 1 | 1 | STANDARD | 2 |
| A |      | 8003 |      | G | 1 | 2 | STANDARD | 1 |

*Fig. 11*

ENGINEERING CHANGE NOTICE - ECD

PURPOSE: UPDATE ITEM A 'VAR1' AND ITEM P1 'CONF1' FOR SERIAL 145-146.

EC AFFECTED ITEM

| EC ID. | ITEM ID. | CUSTOM VARIATION ID. | CONFIG-URATION ID. | DESIGN SEQUENCE NUMBER | DISPOSITION CODE | DISPOSITION QTY. | EFFECTIVITY TYPE | END ITEM ID. | SERIAL START NUMBER |
|---|---|---|---|---|---|---|---|---|---|
| ECA | P1 |  |  | 8001 |  |  | ST | P1 | 001 |
| ECA | A |  |  | 8001 |  |  | ST | P1 | 001 |
| ECB | P1 |  | CONF1 | 8002 |  |  | SC | P1 | 121 |
| ECB | A | VAR1 |  | 8002 |  |  | SC | P1 | 121 |
| ECC | A |  |  | 8003 |  |  | ST | P1 | 131 |
| ECD | A | VAR1 |  | 8004 |  |  | SC | P1 | 145 |
| ECD | P1 |  | CONF1 | 8003 |  |  | SC | P1 | 145 |

BILL OF MATERIAL

| ITEM ID. | CUSTOM VARIATION ID. | DESIGN SEQUENCE INSERT | DESIGN SEQUENCE EXTRACT | COMPONENT ID. | COMPONENT SEQUENCE | QUANTITY PER ASSEMBLY | ITEM FEATURE CODE | COMPONENT POSITION ID. |
|---|---|---|---|---|---|---|---|---|
| A |  | 8001 | 8003 | E | 1 | 2 | STANDARD | 1 |
| A |  | 8001 |  | F | 1 | 1 | STANDARD | 2 |
| A | VAR1 | 8002 | 8004 | E | 1 | 2 | STANDARD | 1 |
| A | VAR1 | 8002 |  | Y | 2 | 1 | STANDARD | 2 |
| A | VAR1 | 8002 |  | Z | 1 | 1 | STANDARD | 2 |
| A |  | 8003 |  | G | 1 | 2 | STANDARD | 1 |
| A | VAR1 | 8004 |  | G | 2 | 2 | STANDARD | 1 |

END ITEM CONFIGURATION - CUSTOM ITEMS

| END ITEM | | | | CUSTOM ITEM | | |
|---|---|---|---|---|---|---|
| ITEM ID. | CONFIG-URATION | INSERT SEQ. | EXTRACT SEQ. | ITEM ID. | VARIATION ID. | EC ID. |
| P1 | CONF1 | 8002 | 8003 | A | VAR1 | ECB |
| P1 | CONF1 | 8003 |  | A | VAR1 | ECD |

CONTRACT END ITEM - CONFIGURATION & EFFECTIVITY

| CONTRACT ID. | CONTRACT LINE NUMBER | END ITEM ID. | END ITEM CONFIGURATION ID. | SERIAL NO. START | SERIAL NO. END |
|---|---|---|---|---|---|
| ABC_1 | 1 | P1 | CONF1 | 121 | 125 |
| ABC_2 | 1 | P1 | CONF1 | 145 | 146 |

*Fig. 12*

METHOD AND SYSTEM FOR PRODUCT CONFIGURATION MANAGEMENT IN A COMPUTER BASED MANUFACTURING SYSTEM

CROSS REFERENCE TO RELATED APPLICATION

This application is related to U.S. Pat. No. 5,307,261, filed of even date herewith, entitled Method and System for Automated Generation of Product Configurations in a Computer Based Manufacturing System, by one of the inventors hereof and assigned to the assignee herein.

BACKGROUND OF THE INVENTION

1. Technical Field

The present invention relates in general to computer based systems for product configuration management in the manufacture of complex products and in particular to methods and systems for defining a product or End Item Configuration for complex end items which involve special engineering design to modify a basic end item to meet specific customer requirements. Still more particularly, the present invention relates to a method and system for tracking multiple as designed end item configurations and their resultant effects on the basic end item.

2. Description of the Related Art

Computer based manufacturing systems are well known in the art. One function such systems typically provide is the tracking of engineering changes which may affect various end item configurations. For example, permanent changes to a basic end item which reduce cost or improve the basic end item are generally tracked in a time oriented manner. Additionally, changes to routings for basic items may occur as permanent changes which may or may not be caused by changes to the basic end item. Additionally, selected end item configurations may be especially created for specific customer contracts and may include changes which are considered as "transient" changes which are made to a basic End Item Configuration for one contract and may or may not be applicable to other contracts. Finally, routings for contracted end item configurations which are considered "transient" changes to the routings specifically for a particular configuration as modified for a customer contract.

Changes to a basic end item are generally incorporated in all Contract End Item configurations when the Contract End Item configurations are initially created. Subsequent changes to a basic end item are not automatically incorporated in the Contract End Item configurations. For example, for repeat orders, a customer may request certain changes to the previously contracted configuration. Appropriate version control techniques are needed to keep track of all changes to a contract End Item Configuration. The term "parallel version control" is generally used in the computer based manufacturing environment to describe this requirement. Parallel versions of an item are independent and concurrently active versions of different configurations of an item. These parallel versions are utilized to maintain a chronological history of all revisions made to each configuration of the same item.

In prior art systems the tracking of "as built" configurations has been accomplished and automated to some degree by a technique of "pegging" parts requirements to specific customer contracts. The recording of actual parts which were used to build a specific end item for a specific customer contract is known as "as built" configuration of the end item. Proper recording and management of "as designed" end item configurations continues to be a complex manual process.

Most existing bill of material systems require different product configurations to be redefined in separate hierarchies from the end item down through all non-standard components. More advanced bill of material systems often provide a multi-level end item effectivity which requires that non-standard items and/or components be relabeled for each new configuration.

Traditionally, most commercially available software in computer based manufacturing systems utilizes "date effectivity" for tracking engineering changes which modify product configurations over time. One such example is the COPICS (Communications Oriented Product Information and Control System) family of products and the MAPICS (Manufacturing Accounting and Production Information Control System) family of products both manufactured by International Business Corporation /f Armonk, N.Y. Version control of product configurations by "effective date" is suitable for tracking improvements or other "permanent" changes made to mass produced standard products but is generally unsuitable for tracking custom built product configurations.

More recently, some of the commercially available products utilized in computer based manufacturing systems have been modified for "serial number effectivity" in order to track "as built" product configurations, primarily to satisfy statutory accounting requirements. One example of such a product is the COPICS Defense product manufactured by International Business Machines Corporation. Such modified software products replace "from/to" dates by "from/to" serial numbers and use "pegged requirements" to connect detail component requirements to serially numbered end products. The "pegging" technique provides an upward traceability from components to assemblies, all the way up to the end product requirements stated in the master production schedule. However, none of the commercially available software products can distinguish between "permanent" changes made to a basic product and "transient" changes made to the basic product to satisfy specific customer requirements.

Thus, it should be apparent that a need exists for a method and system which permits product configuration management in a computer based manufacturing system which can maintain bills of material for item variations independently of the configurations which utilize those materials.

SUMMARY OF THE INVENTION

It is therefore one object of the present invention to provide an improved computer based system for product configuration management in the manufacture of complex products.

It is another object of the present invention to provide an improved method and system for product configuration management which permits the definition of product or end item configurations for complex end items which require special engineering design to modify a basic end item to meet specific customer requirements.

It is yet another object of the present invention to provide an improved method and system for product configuration management in a computer based manufacturing system which permits the tracking of multiple as designed end item configurations and their effects on the basic end item.

The foregoing objects are achieved as is now described. The method and system of the present invention is utilized to create a number of End Item Configuration lists, each End Item Configuration list including a listing of those custom components and variations of standard components which are utilized for a selected configuration of a complex product. A basic bill of materials is also created including a listing of those standard components utilized for all configurations of the complex product. Thereafter, a relationship is established between a particular End Item Configuration list and a customer contract for the manufacture of a selected configuration of a complex product. Based upon the established relationship, a selected one of the End Item Configuration lists is retrieved and combined with a basic bill of materials to create a complete bill of material utilizing both the End Item Configuration list and the basic bill of materials, which may then be utilized in the manufacture of a particular configuration of a complex product. A unique End Item Configuration identifier is established for each configuration of the complex product and is then utilized to maintain an engineering change history associated with each unique End Item Configuration, independent of engineering change histories associated with other configurations for the complex product. Additionally, the configuration data utilized to create a bill of material explosion may be stored in a nonredundant manner independently of the configuration which utilizes that data. In this manner, the End Item Configuration list feature may be added to existing bill of material systems without requiring a redesign of such systems.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 illustrates a sample coding scheme for effectivity type codes which may be utilized with the method and system of the present invention;

FIG. 7 depicts the manner of defining a specific End Item Configuration from a basic item which includes engineer-to-order components in accordance with the method and system of the present invention;

FIG. 8 depicts an Engineering Change Notice which may be utilized to define an initial bill of material for an assembly to be utilized in a basic end item in accordance with the method and system of the present invention;

FIG. 9 depicts an Engineering Change Notice which modifies the bill of material for an assembly in accordance with customer contract specifications for an End Item Configuration in accordance with the method and system of the present invention;

FIG. 11 illustrates an Engineering Change Notice which modifies the bill of material for an assembly utilized in a basic end item in accordance with the method and system of the present invention; and FIG. 12 illustrates an Engineering Change Notice which depicts a repeated customer order for an existing End Item Configuration after the basic end item has been changed during the intervening period in accordance with the method and system of the present invention.

DETAILED DESCRIPTION OF PREFERRED EMBODIMENT

Figure 1:
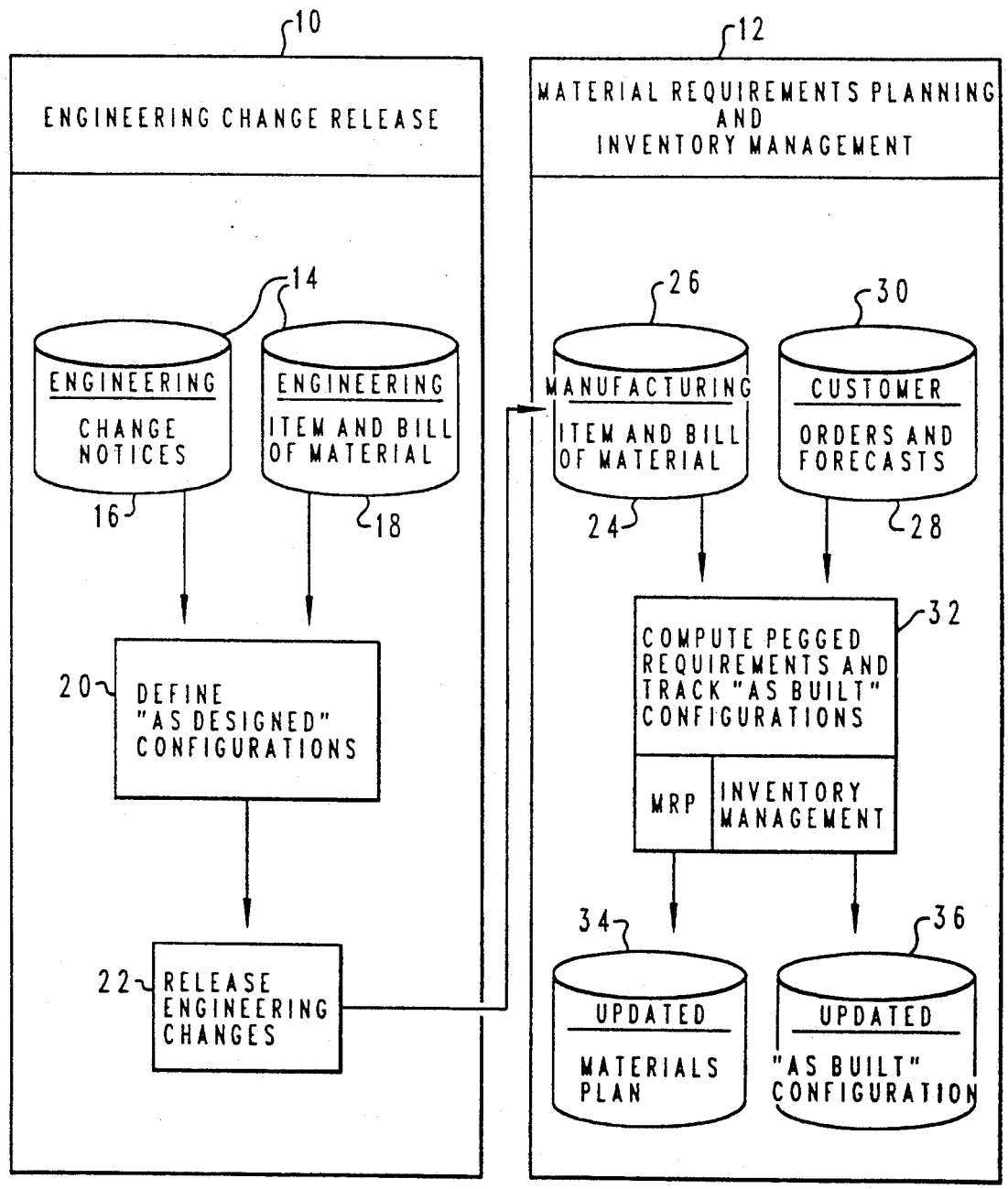
FIG. 1 is a block diagram depicting an example of the business processes which are related to configuration management which may utilize the method and system of the present invention.

With reference now to the figures and in particular with reference to FIG. 1, there is depicted a block diagram which illustrates an example of the business processes which are related to configuration management which may utilize the method and system of the present invention. These business processes involve the integration of the engineering change release function 10 and the material requirements planning and inventory management function 12. Within engineering change release function 10, design engineering functions 14 are utilized to create engineering change notices 16 for any new and/or changed End Item Configuration.

As utilized herein an End Item Configuration shall be stored as a bill of material of a generic end item which consists of a basic end item and all engineer-to-order and make-to-order components and a specific combination of engineer-to-order and make-to-order components which are /rdered by a customer. A unique End Item Configuration identifier is utilized herein to identify each unique combination of items, at all levels of the product structure, that may be utilized in a specific configuration of an end item. This includes selected custom variations of items as described herein. Engineering changes made to a specific End Item Configuration are tracked by conventional time oriented version control methods. Each unique End Item Configuration is thus independently version controlled.

"As designed" end item configurations are then defined, within process 20 and consist of item and bills of material data 18. The engineering change release process 22 then releases the change information to the manufacturing function 26 which may now restructure the data which represents the "as planned" End Item Configuration. Based upon customer orders, as depicted at reference numeral 30 and forecast demands, as depicted at reference numeral 28, the materials requirements planning and inventory management functions 32 can then be utilized to prepare planned orders 34 which are then utilized for tracking "as built" configurations 36. Those skilled in the art will appreciate, as and when necessary, the "as built" configurations 36 may be compared with "as designed" configurations set forth at reference numeral 18 to locate any discrepancies which may exist.

Figure 2:
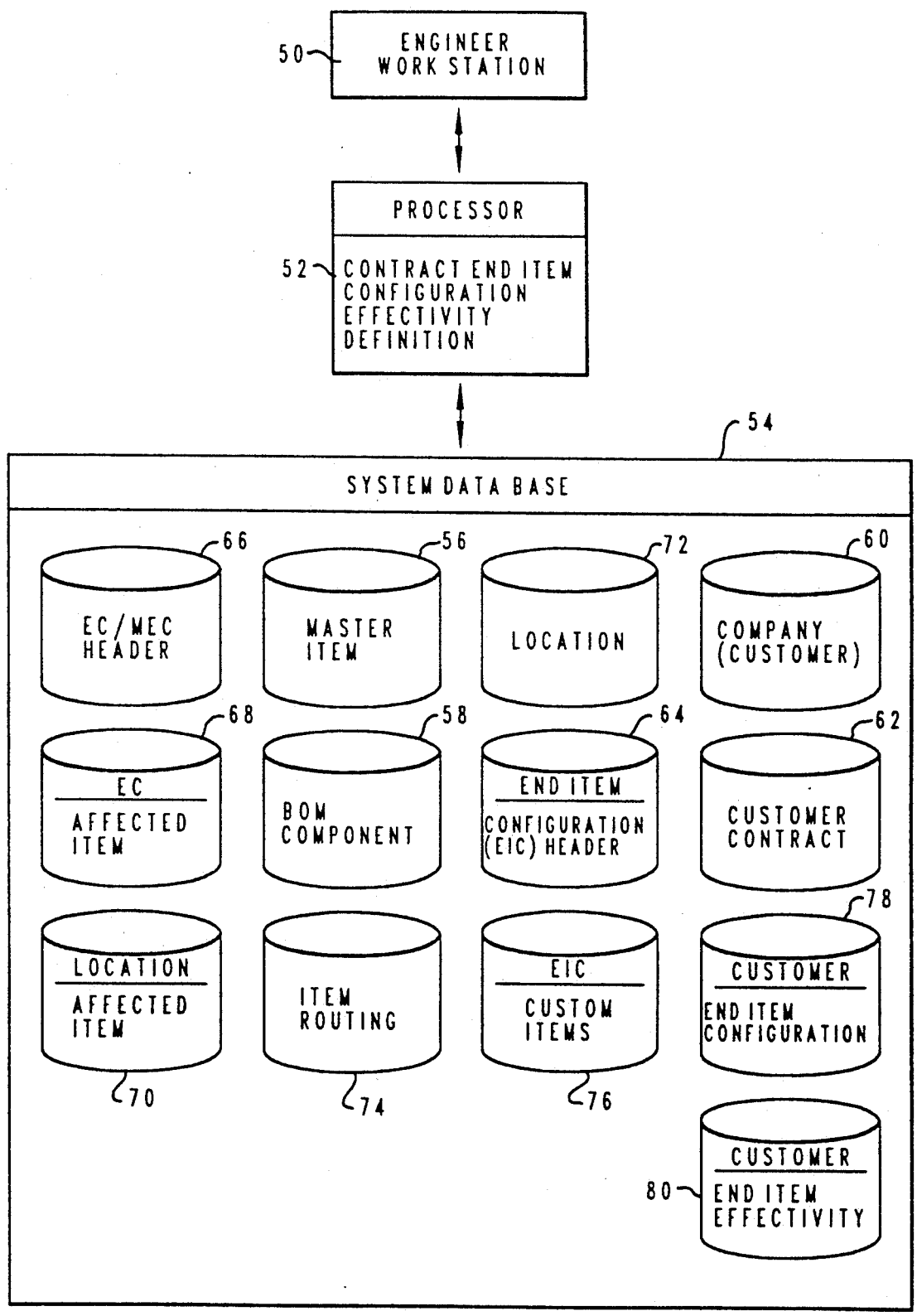
FIG. 2 is a block diagram depicting the computer system components which may be utilized for configuration definition utilizing relational databases in accordance with the method and system of the present invention.

Referring now to FIG. 2, there is depicted a block diagram which illustrates computer system components which may be utilized for configuration definition utilizing relational databases in accordance with the method and system of the present invention. As illustrated, a design engineer may utilize an engineer work station 50 to interact with application processor 52 which accesses relational databases to store and retrieve configuration information. Application processor 52 and work station 50 may be implemented utilizing an IBM System/370 and an IBM System/390, or any other suitable processor and work station unit. System database 54 preferably includes each relational database necessary for configuration definition. Thus, Master Item data, as depicted at reference numeral 56, defines all items including end items, assemblies, and detail parts. Each end item defined within Master Item data 56 has assemblies and components which are recorded in the Bill of Material (BOM) component data at reference numeral 58, which may be utilized to define the "basic" configuration of individual assemblies, as well as specially engineered assemblies for customers. Customer contract information is set forth within database 60 and 62 and ordered configurations are recorded in End Item Configuration header 64. An Engineering Change/Manufacturing Engineering Change headers are created when a customer contracted configuration has specially engineered assemblies and parts and this information is set forth at reference numeral 66. Engineering change affected items are listed at reference numeral 68 and location effected items are listed at reference numeral 70.

A listing of various locations is stored as depicted at reference numeral 70 and item routing and End Item Configuration custom items are set forth at reference numerals 74 and 76 respectively. Finally, customer End Item Configuration data is stored at reference numeral 78 and customer end item effectivity is stored at reference numeral 80. Customer end item effectivity is utilized to set forth noncontiguous ranges of end item serial numbers which are recorded therein. This object contains the most recent and currently active effectivity information.

With reference now to FIG. 3 there is illustrated a sample coding scheme for effectivity type codes which may be utilized with the method and system of the present invention. Sample effectivity codes are listed within a table 90 which includes a first character column 92 and a second character column 94. For convenience in remembering effectivity type codes in English, a customizable two character code is used. Alphabetic codes are assigned to each of these two characters as depicted within FIG. 3. Each character must have valid codes and a combination of two codes identifying the effectivity type for an item. All combinations of the two character code are valid codes within the presently depicted embodiment of the present invention with the exception of the DC code. This is because contract End Item Configuration effectivity may not be utilized with date effectivity.

Phase-in and phase-out effectivity codes may also be recorded in a separate data element to further qualify the effectivity type code. This data may be recorded as an attribute of the following data objects: the Engineering Change Affected Item and the Location Affected Item. Phase-In effectivity code is also preferably recorded in the bill of material component to facilitate retrieval of components which are to be phased in at the time the replace component runs out of stock.

Figure 4:
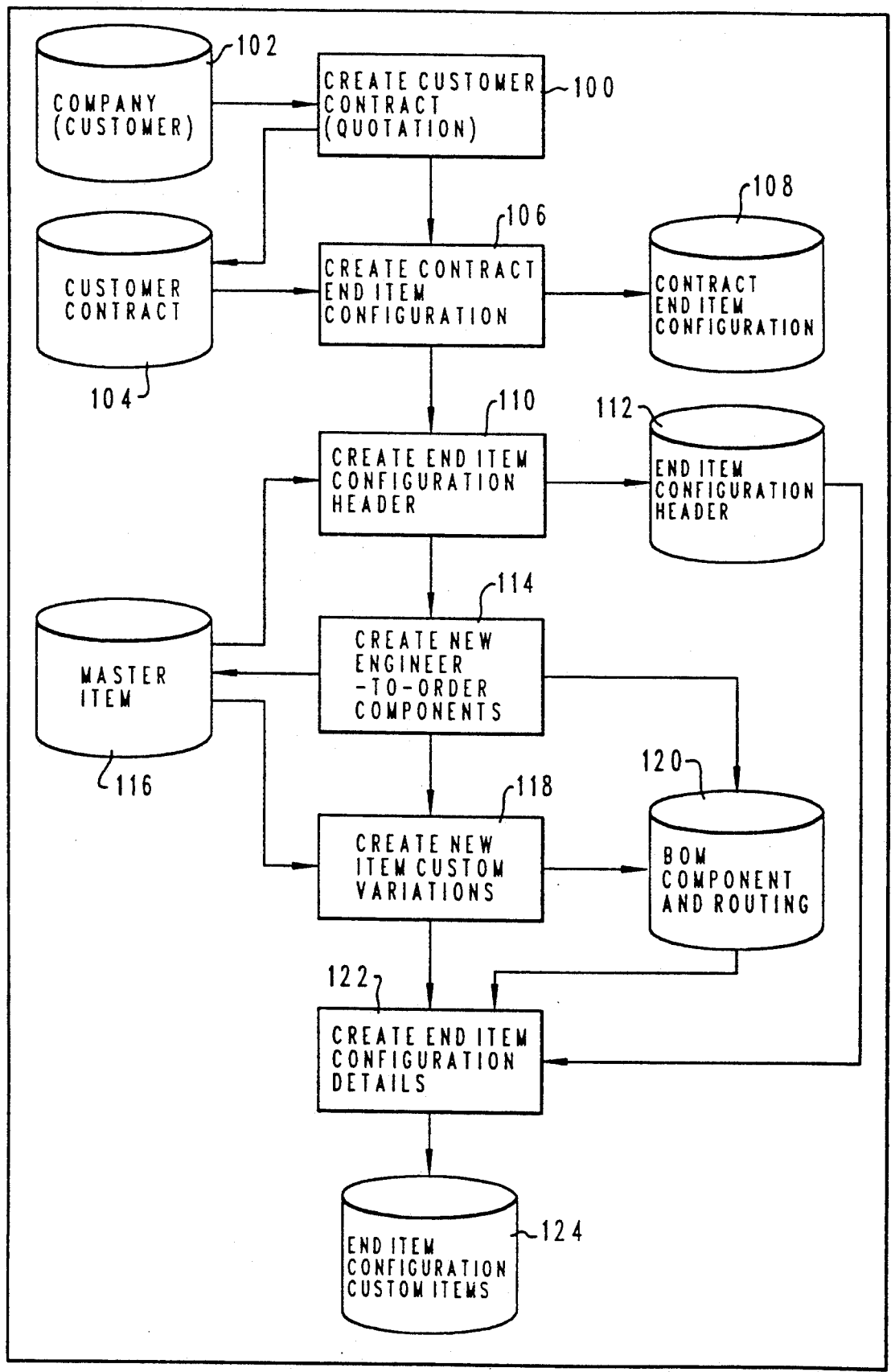
FIG. 4 depicts the business process and data flow for recording a quoted End Item Configuration utilizing the method and system of the present invention.

Referring now to FIG. 4, there is depicted the business process and data flow for recording a quoted End Item Configuration utilizing the method and system of the present invention. The process steps depicted within FIG. 4 need not be executed in strict sequence. The block labeled Create Customer Contract depicts the recording of customer project and contract information for a particular quotation. A contract type indicator within this object may be utilized to indicate which attributes of the object are relevant for the contract. For example, the contract may be part of a larger project or the customer may be an external or internal user. This process takes into account company information from data stored at reference numeral 102 and creates a customer contract which may be stored as indicated at reference numeral 104.

Next, as indicated at block 106 the process creates a Contract End Item configuration. A Contract End Item configuration represents each line item in a contract, in either quotation or order status, with an End Item Configuration identification which is assigned to that line item. Each line item in the contract is preferably for a product model (end item) that is being proposed for sale. The end item identifier (product model) must exist as an item identifier in the master item object. The quantity of the end item for which the quotation is being made is also preferably recorded. A single quotation may contain more than one line item where each line item is for a certain quantity of an end item.

If the line item is for a new End Item Configuration then a new and unique End Item Configuration identifier is assigned to the line item. The End Item Configuration identifier is system generated and is not externalized. The same End Item Configuration identifier is repeated for other line items which have identical end item configurations, possibly with different delivery dates. A previously utilized End Item Configuration identifier may also be reused, for example, when a repeat order for an existing End Item Configuration is received. Thereafter, the Contract End Item configuration is stored as indicated at reference numeral 108.

Next, the process illustrates the creation of an End Item Configuration header, as depicted at block 110. An End Item Configuration header is identified by the end item identifier and the End Item Configuration identifier found within the Contract End Item configuration object. The End Item Configuration header preferably contains header type information such as information about configuration, status and effectivity type. Those skilled in the art will appreciate that various types of end item configurations may be supported, such as "make-to-order" and "engineer-to-order".

The End Item Configuration header object is under engineering change control but may contain headers for non-engineering change controlled end item configurations. For example, new End Item Configuration identifiers generated by a Contract End Item configuration which is in quotation status is not under engineering change control. An End Item Configuration which is not under engineering change control may be promoted to the engineering control status, as needed. It is also possible that at different engineering change levels for an End Item Configuration different routings for the final assembly of the end item may be required. For this purpose, the routing information may also be recorded for an End Item Configuration. The End Item Configuration header is then stored, as indicated at reference numeral 112.

Next, as indicated at reference numeral 114, the process creates new engineer-to-order components. Each End Item Configuration may need to add new components at any level in the bill of material to satisfy unique customer requirements. These components are added by the conventional procedures for adding components to an existing bill of material and when this information is stored within the master item list at reference numeral 116 the item feature code attribute of the bill of material component is set to optional for such components.

Next, the process creates a new item custom variation, as set forth at reference numeral 118. A new item custom variation may be needed to add custom variations to a basic item. These variations to items may be created by utilizing a new item identifier. Thereafter, this item will be treated as a new engineer-to-order component. Additionally, a custom variation of an existing item may be utilized to create a new item identifier. A custom variation of an item is identified by an item custom variation identifier which qualifies the item identifier. The process of creating a new custom variation of an existing item is similar to the conventional process for copying a bill of material to create another bill of material. The main difference are that the from and to item identifiers are for the same item but the item custom variation identifiers are different.

Although the same item identifier may continue to be used the custom variation of an item may or may not be "form, fit and function" compatible with the basic item. These components are added by the normal procedures for creating new items, except that the item custom variation identifier attribute is also specified while creating a variation of an existing item. Thereafter, the bill of material for the engineer-to-order and custom variation components is created and stored at reference numeral 120. Thus, the bill of material created by listing the engineer-to-order components and the custom variation of existing components which is stored as set forth at reference numeral 120 contains those specialized components which are associated with a particular configuration. This information is stored independent of the basic bill of material item and exists in a relationship with a specific configuration so that engineering changes for specific configurations may be tracked and supported independently so that construction of an identified configuration may be achieved more effectively without the requirement of tracking specific configurations by serial numbers as in previously known systems.

Next, the process creates an End Item Configuration detail object. This object contains basic End Item Configuration details which are available from the bill of material header and the bill of material component objects. Bill of material components that have optimal indication in the item feature code attribute are not considered to be part of the basic End Item Configuration. Only those variations to the basic End Item Configuration which are needed to construct a unique Contract End Item configuration are recorded in the End Item Configuration custom items object, as depicted at reference numeral 124.

Figure 5:
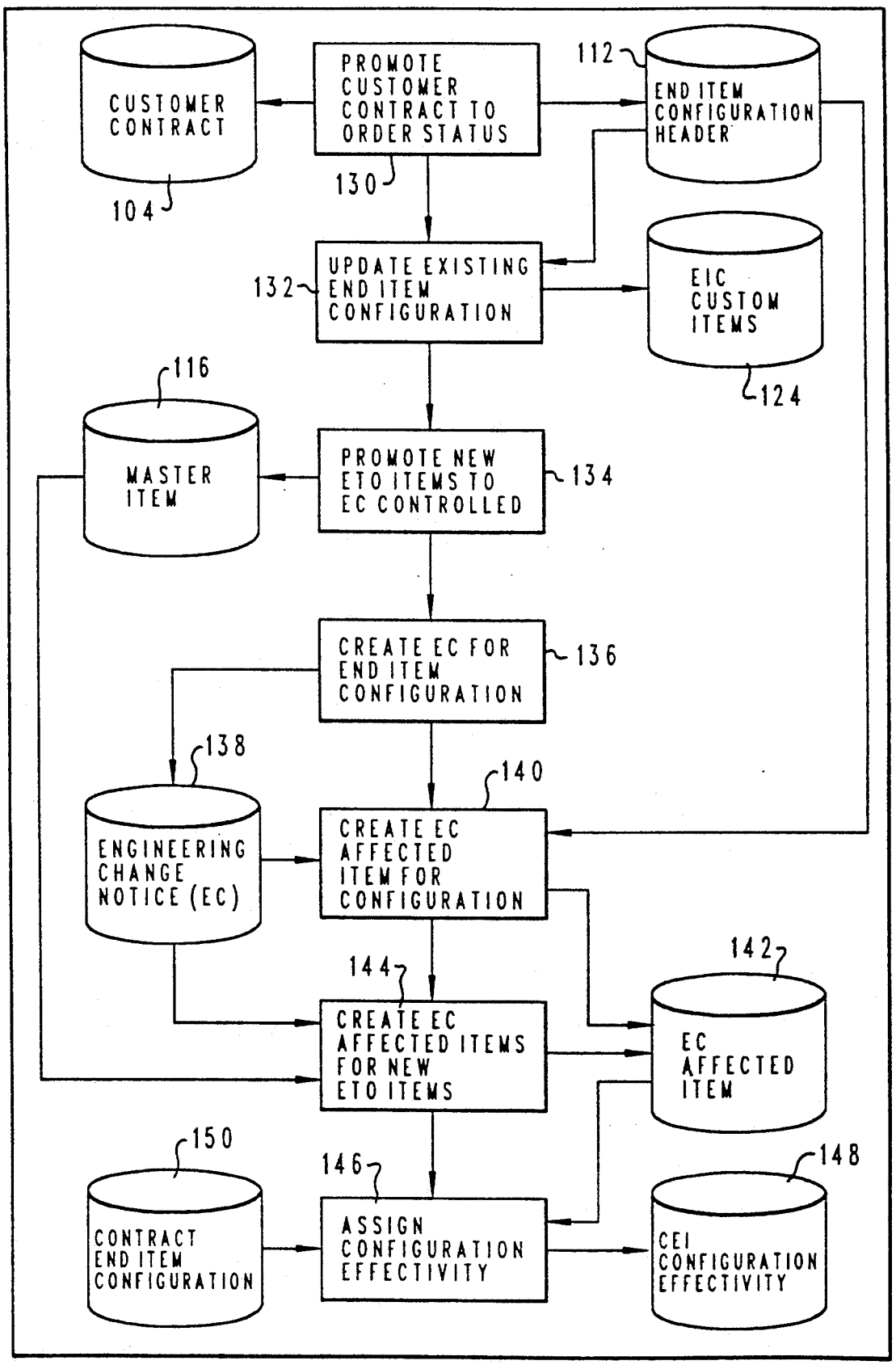
FIG. 5 illustrates the business process and data flow utilized to convert a quotation to an order in accordance with the method and system of the present invention.

With reference now to FIG. 5, there is depicted the business process and data flow utilized to convert a quotation to an order in accordance with the method and system of the present invention. Those data elements of FIG. 5 which are identical to those within FIG. 4 are referred to herein utilizing the same reference numerals for ease in explanation. As above, the process steps discussed below need not be executed strictly in the sequence described. The process begins at block 130 which illustrates the promotion of the customer contract to an order status. This process changes the contract status code in the customer contract object to indicate conversion from quotation to order status. It should be noted that the quotation and order may not be identical and the contract identifier itself may have been changed. Thus, a user of the present method and system will have the choice of either changing the status code of an existing contract or copying an existing contract in quotation status to create a new contract in /rder status. When copied, the original quotation identification is recorded in the related contract identifier attribute to provide traceability of conversion of a quotation to an order. The contract is then stored as a customer contract, as depicted at reference numeral 104. Additionally, End Item Configuration header information is stored at reference numeral 112.

Next, the process passes to block 132, which indicates the updating, if necessary, of existing End Item Configuration information. This updating may need to occur when a customer contract is converted from quotation status to order status. Updating functions may also be required at other times. End item configuration custom items object instances pertaining to a specific End Item Configuration may also be updated as required. Those skilled in the art will appreciate that during updating bill of material retrievals may be performed for viewing end item configurations.

Bill of material net difference method may be utilized to find the "delta" changes between the basic End Item Configuration and Contract End Item configurations. Bill of material retrievals will retrieve all components used in a Contract End Item configuration. This will include basic components and custom variation of components. The basic components for an item are first retrieved, unless a custom variation of the item is used in the End Item Configuration in which case the components of the custom variation of the item are retrieved. Normal retrival principles for engineering change version controlled objects are followed while retrieving End Item Configuration header and its associated detail.

Next, as illustrated in block 134 the new engineer-to-order items are promoted to engineering change controlled status. This is required due to the fact that a new engineer-to-order item to be manufactured may be either a proposed new item which will be used in a bill of material or a proposed new custom variation of an existing item. Only those new items which will be used in bills of material will require promotion from not under engineering change control status to engineering change controlled status so that engineering changes to those items may be supported and tracked. This information is then coupled to the master item database, as depicted at block 116.

Next, an engineering change is created for the End Item Configuration. An engineering change is typically needed for an End Item Configuration header of the type "engineer-to-order" or "make-to-order" when a customer contract for an End Item Configuration is converted from a quotation to an order status. The normal engineering change approval process should be followed before authorizing manufacture of such an End Item Configuration. This engineering change information is then stored within the engineering change notice data, as depicted at block 138.

Next, the process creates an engineering change affected item list for the configuration, as depicted at block 140. The engineering change affected item list is created by a process which is identical to that utilized to create any other affected item object instance in a prerelease status, except that a non-null End Item C/nfiguration identifier is entered into the engineering change affected item. The design sequence number for the affected end item is incremented normally as with any other engineering change for an end item. Thus, the design sequence numbers for all end item configurations and the basic end item are intermixed. This process improves visibility of changes made to the basic end item with respect to any End Item Configuration. It also implements parallel versions since the design sequences for each End Item Configuration will be maintained, except that these numbers are not contiguous for each configuration. This information is then stored as data within the engineering change affected item list, as depicted at block 142.

Next, the process creates an engineering change affected item list for new engineer-to-order items, as depicted in block 144. Utilizing the same engineering change which was utilized for End Item Configuration or a different engineering changes, affected item objects are created for all new engineer-to-order items. A new engineer-to-order item may be either a proposed new item which will be used in a bill of material or a proposed new custom variation of an existing item. As above, a conventional engineering change affected item is created for the engineer-to-order variation of an item, except that a non-null item custom variation identifier is entered in the engineering change affected item. The design sequence number for the affected end item is incremented normally, as with any other engineering change for an end item. Thus, as above, the design sequence numbers for all custom variations of the item and the basic item are intermixed.

Block 146 illustrates the assigning of configuration effectivity. Configuration effectivity is the point at which an engineering change becomes effective for the serial number of a marketable end item containing functional valid combinations of engineer-to-order and/or make-to-order items. A serial number is a unique identification number used by manufacturers to track items individually. Of course, those skilled in the art will appreciate that for producers of chemicals or foods, batch number and lot number are synonymous terms.

An end item that has configuration effectivity may have any number of components that have time oriented effectivity. Serial numbers assigned to end item configurations are recorded in the following objects: engineering change affected item; location affected item; and, Contract End Item configuration effectivity, as illustrated at reference numerals 142 and 148. Contract End Item Configuration is stored in a database as indicated at reference numeral 150.

Figure 6:
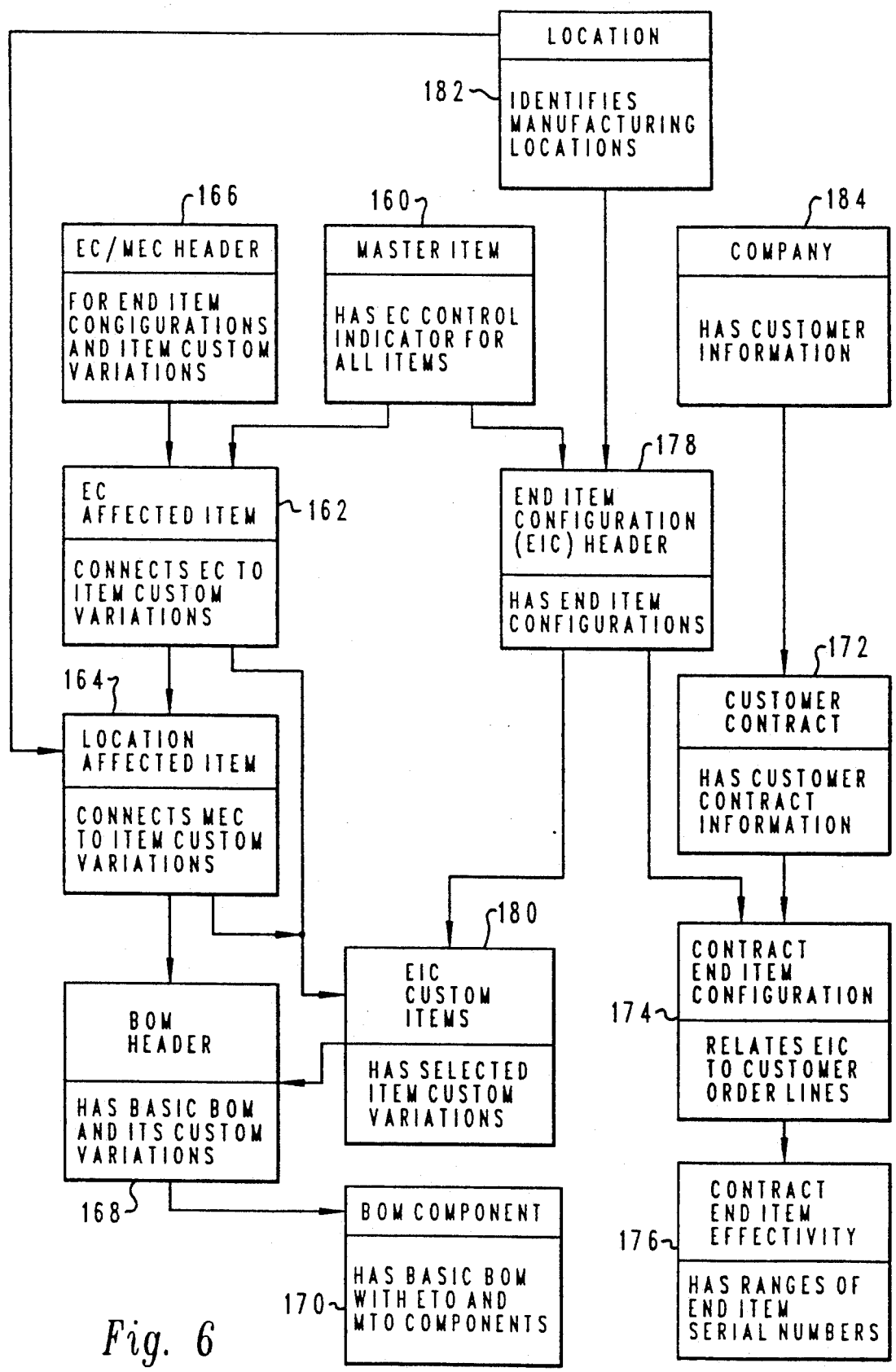
FIG. 6 depicts the relationships between different objects containing effectivity related data for configuration effectivity in accordance with the method and system of the present invention.

Referring now to FIG. 6 there is depicted the relationship between different objects containing effectivity related data for configuration effectivity in accordance with the method and system of the present invention. This diagram indicates data relationships between various data objects and depicts objects which are generally available in existing bill of material systems which may be utilized without modification, objects which may be available within existing bill of material systems which are enhanced by the utilization of additional attributes and new objects which are defined for implementing Contract End Item configuration effectivity in accordance with the method and system of the present invention.

Blocks 182 and 184 depict identification of the manufacturing locations and customer for a particular end item and are generally available in existing bill of material systems. The remaining existing, enhanced and/or new objects depicted within FIG. 6 are set forth in detail within the tables below. Each table sets forth whether the object is an existing object, an enhanced object or a new data object and lists the various attributes associated with the particular object and the usage of that attribute for configuration effectivity in accordance with the method and system of the present invention. Each table number corresponds to the number of the object depicted within FIG. 6, for ease of explanation.

TABLE 160

MASTER ITEM (Existing Object)

| Attribute | Attribute Usage for Configuration Effectivity | Notes |
|---|---|---|
| Item Identifier | It uniquely identifies an item or an end item. | |
| Item Change Type | It indicates whether a new engineer-to-order item is EC controlled. | |
| Other existing attributes | Other existing attributes of this object are not used for configuration effectivity implementation. | |

TABLE 162

AFFECTED ITEM (Enhanced Existing Object)

| Attribute | Attribute Usage for Configuration Effectivity | Notes |
|---|---|---|
| EC Identifier | It identifies the EC for end item configurations and custom (engineer-to-order) variations of items. This is a part of the unique logical key. | |
| Item Identifier | It identifies end items that have CEI configurations effectivity. It also identifies custom (engineer-to-order) variations of items. This is a part of the unique logical key. | |
| End Item Configuration Identifier | It identifies an end item configuration. For CEI configurations, the end item configuration identifier must exist in the CEI configuration object. For the "basic" end item configuration, a null (blanks) configuration identifier is used. (Note that for engineer-to-order items other than end items, the item custom variation identifier is used instead of the end item configuration identifier.) | A new data element is used. |
| Item Custom Variation Identifier | Custom variations of an item are independent and concurrently active versions of different custom built (engineer-to-order) variations of an item. The EC version control techniques maintain chronological history of all revisions made to each such custom variation of the same item. Custom variations of an item may or may not have the same form, fit and function. All components used in one such custom variation of an item has the same item custom variation identifier. | A new data element is used. |
| Item Status | Prerelease Status | |

TABLE 162-continued
AFFECTED ITEM (Enhanced Existing Object)

| Attribute | Attribute Usage for Configuration Effectivity | Notes |
|---|---|---|
| Code | The affected CEI configuration is in prerelease status before it is released to different manufacturing locations. Effectivity data is not required to be entered in the CEI configuration effectivity object at this time.<br>Released Status<br>The affected CEI configuration is in released status after it is released to different manufacturing locations. Effectivity data must be entered in the CEI configuration effectivity object prior to release. Subsequent promotion of affected CEI configurations to accept and effective status are recorded in the Location Affected Item. | |
| Planned Effectivity Type Code | It indicates the type of effectivity for an affected CEI configuration or a custom (engineer-to-order) variation of an item. For CEI configurations, this code must match with the planned effectivity type code in the end item configuration header object.<br>Suggested values:<br>SC - CEI serial number<br>BC - CEI batch number<br>LC - CEI lot number | New effectivity type codes are used. |
| Planned Effectivity Start Date | This represents the date when an affected item is planned to be made effective at all manufacturing views (locations) supported by a computing system location. For CEI configuration effectivity type codes SC, BC and LC, and for custom variations of items with end item serial number effectivity type codes ST, BT and LT, the planned start dates must be in ascending sequence matching with sequence of planned effectivity start numbers in this object. | |
| Planned Effectivity Start Number | This represents the end item serial or batch or lot number at which an affected item is planned to be made effective in all manufacturing views (locations) supported by a single computing system location. It is required for affected items in accept status with effectivity type code other than DT. It represents serial or batch or lot number as indicated by the planned effectivity type code. The effectivity start number for a later EC/MEC level implies effectivity end number for the prior EC/MEC level. | |
| Planned End Item Identifier | It identifies the end item for which the planned effectivity start number applies. | |
| Other existing attributes | Other existing attributes of this object are not used for configuration effectivity implementation. | |

TABLE 164
LOCATION AFFECTED ITEM (Enhanced Existing Object)

| Attribute | Attribute Usage for Configuration Effectivity | Notes |
|---|---|---|
| EC-MEC Identifier | It identifies the EC or MEC for end item configurations and custom (engineer-to-order) variations of items. This is a part of the unique logical key. | |
| Item Identifier | It identifies end items that have CEI configuration effectivity. It also identifies custom (engineer-to-order) variations of items. This is a part of the unique logical key. | |
| Location Identifier | Identifies the manufacturing location at which both planned and actual effectivity data apply. | |
| End Item Configuration Identifier | It identifies an end item configuration. For CEI configurations, the end item configuration identifier must exist in the CEI configuration object. For the "basic" end item configuration, a null (blanks) configuration identifier is used. (Note that for engineer-to-order items other than end items, the item custom variation identifier is used instead of the end item configuration identifier.) This is a part of the unique logical key. | A new data element is used. |
| Item Custom Variation Identifier | Custom variations of an item are independent and concurrently active versions of different custom built (engineer-to-order) variations of an item. The EC version control techniques maintain chronological history of all revisions made to each such custom variation of the same item. Custom variations of an item may or may not have the same form, fit and function. All components used in one such custom variation of an item has the same item custom variation identifier. This is a part of the unique logical key. | A new data element is used. |
| Item Status Code | Accept Status<br>This indicates that the affected CEI configuration has been accepted in the manufacturing view at the location and it is ready to be made effective. Planned effectivity data is copied over from EC Affected Item.<br>Effective Status<br>This indicates that the affected CEI configuration that was in accepted status has now been made effective in the manufacturing view at the location. For CEI configurations, actual effectivity data must be entered in this location affected item object and in the CEI configuration effectivity object before promotion to effective status. Subsequent changes to actual effectivity are allowed only in the CEI configuration effectivity object, without requiring an EC to do so. A warning message is issued when the actual effectivity start number in the CEI configuration effectivity object is changed to a number that is less than the planned effectivity start number in this location affected item object.<br>Closed Status<br>This indicates that no further changes to the location affected item data are allowed. | |
| Planned Effectivity Type Code | It indicates the type of effectivity for an affected CEI configuration or a custom (engineer-to-order) variation of an item. For CEI configurations, this code must match with the planned effectivity type code in end item configuration header object.<br>Suggested values for CEI configuration effectivity are:<br>SC - CEI serial number<br>BC - CEI batch number<br>LC - CEI lot number | New effectivity type codes are used. |
| Actual Effectivity Type Code | It indicates the type of effectivity for an affected CEI configuration or a custom (engineer-to-order) variation of an item. For CEI configurations, this code must match with the actual effectivity type code in end item | New effectivity type codes are used. |

TABLE 164-continued
LOCATION AFFECTED ITEM (Enhanced Existing Object)

| Attribute | Attribute Usage for Configuration Effectivity | Notes |
|---|---|---|
| | configuration header object. Suggested values for CEI configuration effectivity are: SC - CEI serial number BC - CEI batch number LC - CEI lot number | |
| Planned Effectivity Start Date | This represents the date when a location affected item is planned to be made effective at a manufacturing location. It is required for all affected items in accept status. The effectivity start date for a later EC/MEC level implies effectivity end date for the prior EC/MEC level. For CEI configuration effectivity type codes SC, BC and LC, and for custom variations of items with end item serial number effectivity type codes ST, BT and LT, the planned start dates must be in ascending sequence matching with sequence of planned effectivity start numbers. | |
| Actual Effectivity Start Date | This represents the actual date when an affected item is to be made effective at a manufacturing location. It is required for affected items in effective status. The effectivity start date for a later EC/MEC level implies effectivity end date for the prior EC/MEC level. For CEI configuration effectivity type codes SC, BC and LC, and for custom variations of items with end item serial number effectivity type codes ST, BT and LT, the actual start dates must be in ascending sequence matching with sequence of actual effectivity start numbers in this object. | |
| Planned Effectivity Start Number | This represents the end item serial or batch or lot number at which an affected item and its custom (engineer-to-order) variations are planned to be made effective at a manufacturing location. It is required for affected items in accept status with effectivity type code other than DT. It represents serial or batch or lot number as indicated by the planned effectivity type code. The effectivity start number for a later EC/MEC level implies effectivity end number for the prior EC/MEC level. | |
| Actual Effectivity Start Number | This represents the end item serial or batch or lot number at which an affected item and its custom (engineer-to-order) variations are to be actually made effective at a manufacturing location. It is required for affected items in accept status with effectivity type code other than DT. It represents serial or batch or lot number as indicated by the actual effectivity type code. The effectivity start number for a later EC/MEC level implies effectivity end number for the prior EC/MEC level. | |
| Planned End Item Identifier | It identifies the end item for which the planned effectivity start number applies. | |
| Actual End Item Identifier | It identifies the end item for which the actual effectivity start number applies. | |
| Other existing attributes | Other existing attributes of this object are not used for configuration effectivity implementation. | |

TABLE 166
ENGINEERING CHANGE HEADER (Existing Object)

| Attribute | Attribute Usage for Configuration Effectivity | Notes |
|---|---|---|
| EC-MEC Identifier | It identifies the EC or MEC for end item configurations and custom (engineer-to-order) variations of items. | |
| Other existing attributes | Other existing attributes of this object are not used for configuration effectivity implementation. | |

TABLE 168
BILL OF MATERIAL HEADER (Enhanced Existing Object)

| Attribute | Attribute Usage for Configuration Effectivity | Notes |
|---|---|---|
| Item Identifier | It identifies custom (engineer-to-order) variations of items. This is a part of the unique logical key. | |
| Location Identifier | Identifies the manufacturing location at which both planned and actual effectivity data apply. This is a part of the unique logical key. | |
| Item Custom Variation Identifier | Custom variations of an item are independent and concurrently active versions of different custom built (engineer-to-order) variations of an item. The EC version control techniques maintain chronological history of all revisions made to each such custom variation of the same item. Custom variations of an item may or may not have the same form, fit and function. All components used in one such custom variation of an item has the same item custom Variation identifier. This is a part of the unique logical key. | A new data element is used. |
| Other existing attributes | Other existing attributes of this object are not used for configuration effectivity implementation. | |

TABLE 170
BILL OF MATERIAL COMPONENT (Enhanced Existing Object)

| Attribute | Attribute Usage for Configuration Effectivity | Notes |
|---|---|---|
| Item Identifier | It identifies custom (engineer-to-order) variations of items. This is a part of the unique logical key. | |
| Location Identifier | Identifies the manufacturing location at which both planned and actual effectivity data apply. This is a part of the unique logical key. | |
| Item Custom Variation Identifier | Custom variations of an item are independent and concurrently active versions of different custom built (engineer-to-order) variations of an item. All components used in one such custom variation of an item has the same item custom Variation identifier. | A new data element is used. |
| Component Item Identifier | It identifies an item which is used as a component. This is a part of the unique logical key. | |
| Component Custom Variation Identifier | It identifies a custom variation of an item which is used as a component. | A new data element is used. |
| Item Feature Code | It identifies BOM components that are optionally used in the higher level assembly. These components are engineer-to-order or make-to-order components. | |
| Other existing attributes | Other existing attributes of this object are not used for configuration effectivity implementation. | |

TABLE 172

CUSTOMER CONTRACT (Enhanced Existing Object)
This object contains a subset of the attributes normally found in the customer orders used by customer order servicing application.
This object is not under engineering change control. The attributes in this object are those required by the design engineering and manufacturing engineering functions.

| Attribute | Attribute Usage for Configuration Effectivity | Notes |
|---|---|---|
| Contract Identifier | It identifies a customer contract or an internal order. A customer quotation or order identifier is used when a formal customer contract is not available. It is a required attribute. It is the unique logical key. | |
| Contract Date | It is the date on a customer's contract or on a quotation. It is the unique logical key. | |
| Contract Type Indicator | It indicates the type of contract. Suggested values: CC - Customer contract (default) CP - Customer project contract IC - Internal order IP - Internal project order | |
| Contract Status Code | It indicates progressive status of the customer contract. Suggested values: Q - Quotation O - Order | |
| Customer Identifier | It identifies a company who is a customer or a prospective customer. It may also identify an internal customer such as another manufacturing plant. It is required for contract types CC and CP and it is optional for contract types IC and IP. | |
| Project Identifier | It identifies a customer project or an internal project for which one or more contracts are identified. It is required for contract types CP and IP and it is null (blanks) for other contract types. | |
| Contract Description | It briefly describes the contract. | |
| Related Contract Identifier | It identifies another customer contract or an internal order that is related to this customer contract or an internal order. The main purpose is to retain the relationships between quotations and orders when the quotation and order identifiers are not the same when a quotation is converted to an order. | A new data element is used. |
| Other existing attributes | Other existing attributes of this object are not used for configuration effectivity implementation. | |

TABLE 174

CONTRACT END ITEM (CEI) CONFIGURATION
(New Object)
The object represents the relationship between the customer contract object and the End Item Configuration header object. The intersection data contains a subset of attributes normally found in the customer order line items used by customer order servicing application. So this object also represents the relationship between the customer order line items and the End Item Configuration header.
This object is not under engineering change control. The attributes in this object are those required by the design engineering and manufacturing engineering functions.

| Attribute | Attribute Usage for Configuration Effectivity | Notes |
|---|---|---|
| Contract Identifier | It identifies a customer contract or an internal order. A customer quotation or order identifier is used when a formal customer contract is not available. It is a required attribute. It is a part of the unique logical key. | |
| Contract Line Number | It identifies the line number in a customer contract or an internal order. It is a required attribute. It is a part of the unique logical key. | |
| Number | It is a required attribute. It is a part of the unique logical key. | |
| Contract End Item (CEI) Identifier | It identifies a contract end item (CEI) on one line of a customer contract. It is usually a product model or a fully interchangeable assembly for which a specific customer configuration is defined. The item must exist in the Master Item object. It is a required attribute. | |
| CEI Effectivity Type Code | It indicates the "active" effectivity type for the CEI configuration. See end item configuration header object for an explanation of the active effectivity type code. Suggested values for CEI configuration effectivity are: SC - CEI serial number BC - CEI batch number LC - CEI lot number | New effectivity type codes are required. |
| CEI Order Quantity | It indicates the order quantity for a customer end item that appears on one line of the customer contract. | |
| CEI Order Quantity Unit of Measure | It is the unit of measure for the CEI quantity. | |
| CEI Delivery Date | It indicates the customer requested delivery date for an end item that appears on one line of the customer contract. | |
| End Item Configuration Identifier | It uniquely identifies a specific configuration of the end item. It is system generated and not externalized. An existing end item configuration identifier can be reused by copying it from another instance of this CEI configuration object. | |

TABLE 176

CONTRACT EFFECTIVITY (New Object)
This object is not under engineering change control but it contains references to engineering changes for items that are under engineering change control.

| Attribute | Attribute Usage for Configuration Effectivity | Notes |
|---|---|---|
| Contract Identifier | It identifies a customer contract or an internal order. A customer quotation or order identifier is used when a formal customer contract is not available. It is a required attribute. It is a part of the unique logical key. | |
| Contract Line Number | It identifies the line number in a customer contract or an internal order. It is a required attribute. It is a part of the unique logical key. | |
| Effectivity Sequence Number | It uniquely identifies a range of end item serial numbers pertaining to a contract line item. Each line item in a contract is allowed to have a number of broken ranges of end item serial numbers. This is a part of the unique logical key. | |
| Effectivity Start Number | It indicates the beginning of a range of serial/batch/lot numbers that identifies the production sequence of the units of an end item across all CEI configurations for the end item. It represents serial or batch | |

TABLE 176-continued

CONTRACT EFFECTIVITY (New Object)
This object is not under engineering change control but it contains references to engineering changes for items that are under engineering change control.

| Attribute | Attribute Usage for Configuration Effectivity | Notes |
|---|---|---|
| | or lot number as indicated by the effectivity type code in this object. The serial start number cannot be greater than serial end number. | |
| Effectivity Serial End Number | It indicates the end of a range of serial/batch/lot numbers that identifies the production sequence of the units of an end item across all CEI configurations for the end item. It represents serial or batch or lot number as indicated by the effectivity type code in this object. The serial end number cannot be less than serial start number. When serial end number is unknown, a very high number may be used to indicate indefinite end number. | |

TABLE 178

END ITEM CONFIGURATION (EIC) HEADER (New Object)
This object is under EC/MEC version control, but it may contain non-EC controlled end item configurations.

| Attribute | Attribute Usage for Configuration Effectivity | Notes |
|---|---|---|
| End Item Identifier | It identifies an end item. An end item is defined as a finished product sold as a complete item or a repair part. Any item that is subject to a customer order or sales forecast is an end item. Also, the highest level of assembly shown by the bill of material. For CEI configuration effectivity purposes, it is usually a product model or a fully interchangeable assembly for which a specific customer configuration is defined. The end item must exist in the Master Item object. This is a part of the unique logical key. | |
| End Item Configuration Identifier | It uniquely identifies a specific configuration of the end item as found in the CEI configuration object. It is not externalized. This configuration identifier must match a CEI configuration identifier in the CEI configuration object. This is a part of the unique logical key. | |
| EIC View Identifier | It uniquely identifies a specific view of a CEI configuration. The configuration may be differently restructured in each view. Suggested values: E - engineering view M1 - manufacturing view 1 Mn - manufacturing view n C1 - costing view 1 Cn - costing view n R1 - rework view 1 Rn - rework view n S1 - sand box view 1 Sn - sand box view n This is a part of the unique logical key. | |
| Location Identifier | It identifies the location at which this EIC/header object is used. It further qualifies the EIC views that may be uniquely restructured at each location. An implementation option is to use a unique EIC view identifier (for example, using subscripts 1 through n) for any location that needs to uniquely restructure the end item configuration. This will avoid the need to use a combination of EIC view identifier and location identifier data elements to uniquely identify each view. This will allow any of the views to be shared by more than one locations that are supported by a single processor. | |

TABLE 178-continued

END ITEM CONFIGURATION (EIC) HEADER (New Object)
This object is under EC/MEC version control, but it may contain non-EC controlled end item configurations.

| Attribute | Attribute Usage for Configuration Effectivity | Notes |
|---|---|---|
| Insert Sequence Number | This is a part of the unique logical key. It identifies the inserting EC or MEC that created this instance of the EIC header object. It is the same as design/manufacturing sequence number in the EC/location affected item object for the end item. For an end item configuration that is not under EC control, this attribute is set to a value of "non-EC controlled". This is a part of the unique logical key. | |
| Extract Sequence Number | It identifies the extracting EC or MEC that created this instance of the EIC header object. It is the same as design/manufacturing sequence number in the EC/location affected item object for the end item. For an end item configuration that is not under EC control, this attribute is set to a value of "non-EC controlled". | |
| EIC Type Code | It indicates the type of end item configuration. An end item configuration may include different types of item configurations. Suggested values: MTO - make-to-order: uses predesigned item(s). ETO - engineer-to-order: has new item(s) to be designed. | |

TABLE 180

END ITEM CONFIGURATION (EIC) CUSTOM ITEMS (New Object)
This object is under EC/MEC version control, but it may contain non-EC controlled end item configurations.

| Attribute | Attribute Usage for Configuration Effectivity | Notes |
|---|---|---|
| End Item Identifier | It identifies an end item as found in the EIC header object. This is a part of the unique logical key which must match with a logical key of the EIC header object. | |
| End Item Configuration Identifier | It uniquely identifies a specific configuration of the end item as found in the EIC header object. It is not externalized. This is a part of the unique logical key which must match with a logical key of the EIC header object. | |
| EIC View Identifier | It uniquely identifies a specific view of an end item configuration as found in the EIC header object. This is a part of the unique logical key which must match with a logical key of the EIC header object. | |
| Location Identifier | It identifies the location at which this EIC custom items object is used as per the EIC header object. This is a part of the unique logical key which must match with a logical key of the EIC header object. | |
| Insert Sequence Number | It identifies the inserting EC or MEC that created this instance of the EIC custom items object. It is the same as design/manufacturing sequence number in the EC/location affected item object for the end item. For an end item configuration that is not under EC control, this attribute is set to a value of "non-EC controlled". This is a part of the unique logical key. | |
| EIC Extract Sequence Number | It identifies the extracting EC or MEC that created this instance of the EIC custom items object. It is the same as design/manufacturing sequence number in the | |

TABLE 180-continued

END ITEM CONFIGURATION (EIC) CUSTOM ITEMS
(New Object)
This object is under EC/MEC version control, but it may contain non-EC controlled end item configurations.

| Attribute | Attribute Usage for Configuration Effectivity | Notes |
|---|---|---|
| Item Identifier | EC/location affected item object for the end item. For an end item configuration that is not under EC control, this attribute is set to a value of "non-EC controlled". It identifies the following type of item that is included in the end item configuration: an item that has a custom (engineer-to-order) variations This item must exist as an EC/location affected item with matching item custom variation identifier, location identifier and EC-MEC identifier. This is a part of the unique logical key. | |
| Item Custom Variation Identifier | Custom variation of an item are independent and concurrently active versions of different custom built (engineer-to-order) active versions of different custom built (engineer-to-order) variations of an item. The EC version control techniques maintain chronological history of all revisions made to each such custom variation of the same item. Custom variations of an item may or may not have the same form, fit and function. All components used in one such custom variation of an item has the same Item Custom Variation Identifier. This is a part of the unique logical key. | |
| Item EC-MEC Identifier | It identifies the EC or MEC for the item custom variation identifier used in this configuration. The default is to use the latest EC/MEC at the time this object instance is created. | |

With reference now to FIG. 7, there is depicted a product configuration identification example which may be utilized to define a specific End Item Configuration from a basic item which includes engineer-to-order components in accordance with the method and system of the present invention. As set forth in product configuration identification example 190, the configuration set forth includes an Engineering Change Notice which authorizes the design of a basic end item P1 with end item serial numbers ranging from 001 through 999. A bill of material 192 for end item P1 is defined as a generic end item with a standard assembly A and make-to-order components (assemblies) B, C, and D. These components are identified by the optional item feature code attribute set forth at reference numeral 194 within bill of material 192. The design sequence number 8001 is system generated when the ECA affected item object (not shown) is created for item A. It is recorded as the insert sequence number for the bill of material components as indicated at reference numeral 196 within bill of material 192.

Still referring to FIG. 7, subsequently, a customer ABC, contract ABC-1, line 1, has specified an order of five units of end item P1 with the standard assembly A (modified) and made-to-order assemblies B and D. This configuration of P1 is assigned a configuration identifier of "Conf1" as indicated at reference numeral 198 within End Item Configuration list 200. This configuration contains an engineer-to-order modification to an item. Thus, the configuration itself requires an engineering change notice. Engineering change notice "ECB" is set forth at reference numeral 202 and is utilized to create the End Item Configuration header (not shown) and its various objects. The design sequence number generated by ECB affected item P1 is 8002, as set forth at reference numeral 204.

The made-to-order assemblies B and D, selected for this configuration "Conf1" of end item P1 are then recorded in the End Item Configuration custom items object (not shown). The current engineering change level of the parent assembly P1 is also recorded.

The customer contract ABC-1 specified a modification to standard assembly A which was initially created by ECA during initial creation of P1. Engineering change notice ECB, which authorized the design of End Item Configuration "Conf1" for P1, also authorizes the design of custom variation "Var1" of item A, as set forth at reference numeral 206. This custom variation of item A is assigned an item custom variation identifier "Var1". Inclusion of this variation of item A in the configuration "Conf1" of P1 is recorded in the End Item Configuration custom items object. The engineering change level "ECB" for item A variation "Var1" is also recorded. Later engineering change levels of item A variation "Var1" may or may not be usable in P1 configuration "Conf1".

The effectivity information is recorded in the Contract End Item configuration object and its subordinate Contract End Item effectivity object, which are shown combined within FIG. 7 at reference numeral 208. This object depicts the fact that the contract ABC-1, line 1, for end item P1 uses the End Item Configuration identifier "Conf1" and is effective for item P1 serial numbers beginning at 121 and ending at 125.

The examples depicted within FIG. 7 have been simplified for purposes of explanation and do not show all attributes of all objects. All views of the End Item Configuration are not shown. For example, an End Item Configuration will have both engineering and manufacturing views of the configuration.

Referring now to FIG. 8, there is depicted an Engineering Change Notice which may be utilized to define an initial bill of material for an assembly to be utilized in a basic end item in accordance with the method and system of the present invention. As depicted, Engineering Change Notice ECA, as set forth at reference numeral 210 is utilized to define the bill of material for assembly A to be utilized in the basic end item P1 serial numbers 1 through 999. Assembly A has the following components: component E (quantity 2) and component F (quantity 1). The engineering change affected item data as set forth at reference numeral 212, relates Engineering Change Notice ECA to the basic item A with a null value listed for the custom variation identifier at reference numeral 214. The affected item specifies time oriented end item serial number effectivity utilizing effectivity code ST (see FIG. 3) starting at serial number 001 and continuing indefinitely (up to serial number 999 . . . ) utilizing the normal version control technique. A design sequence number 8001 is assigned to this version of item A, which is affected by Engineering Change Notice ECA.

A bill of material 218 is included, and indicates that assembly A utilizes component E in quantity 2 and component F in quantity 1. The design sequence number 8001 is included within bill of material 218 at reference numberal 220 as the insert sequence number. Thus, knowing the insert sequence number it is relatively easy to find the inserting engineering change identifier and the effectivity of the components as recorded in the engineering change affected item object. The component position identifiers are assigned to sequence the components for display or printing.

With reference now to FIG. 9, there is depicted an Engineering Change Notice which modifies the bill of material for an assembly in accordance with customer contract specifications for an End Item Configuration in accordance with the method and system of the present invention. As depicted, Engineering Change Notice ECB as set forth at reference numeral 222 is utilized to modify the bill of material for assembly A for customer variation "Var1" of item A as per customer ABC contract ABC-1 specifications. This modification is accomplished by replacing basic component F with components Y and Z with a quantity of one each. This replacement of basic component F of this customer contract should not be visible to other customer contracts where component F is not to be replaced. This version control technique is further defined such that any modifications to the basic end item for one contract remain invisible to other contracts. For this purpose, a unique custom variation identifier "Var1" is assigned to this variation of item A and a new bill of material is constructed by first copying the basic bill of material and then making the required modifications.

Thus, engineering change affected item object 224 sets forth the item variation ID for this item and is then utilized to modify bill of material 226. The "Var1" identifier is carried in the engineering change affected item at reference numeral 224 and the bill of material components listing at 226. The new design sequence number 8002 is also carried in the engineering change affected item object 224 and bill of material 226. The "Var1" variation of item A may be used for contract ABC-1 or any other contract by selecting the components which have "Var1" identification. As indicated in the engineering change affected item object, the "Var1" variation of item A may be used in any configuration of end item P1 starting at serial number 121 onwards. Effectivity of both the basic item A staring at serial number 001 and the "Var1" variation of item A starting at serial number 121 are independently and concurrently active. It should be noted that component E has two unextracted instances, one for basic item and A and another for the "Var1" variation of item A.

The user specified component position identifiers for components Y and Z are assigned the same identifier "2" as that &/r component F. These indicate that components Y and Z replaced component F. This technique provides traceability of changes made to basic item A to construct the "Var1" of item A.

Figure 10:
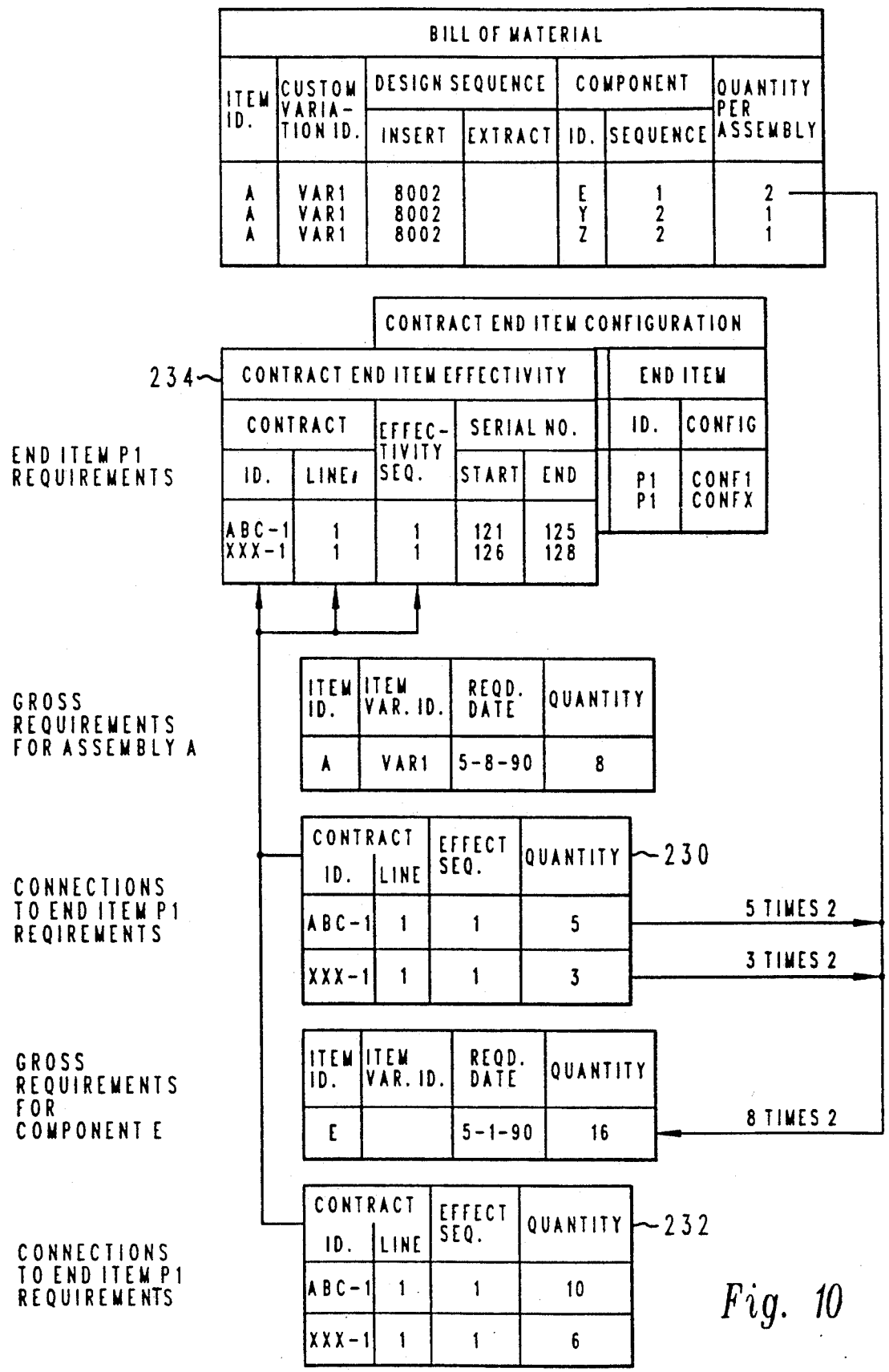
FIG. 10 is an illustration of the technique of pegging detail component requirements to customer contracts in accordance with the method and system of the present invention.

Referring now to FIG. 10, there is depicted an illustration of the technique of pegging detail component requirements to customer contracts in accordance with the method and system of the present invention. As illustrated, each contract line item, as depicted at reference numerals 230 and 232 has associated with it a range or ranges of end item serial numbers set forth within Contract End Item effectivity object 234. Each range of serial numbers, identified by the Contract End Item effectivity sequence number, acts as a "peg" that may have a different delivery date. These pegs may be utilized for tracking of "as built" end item configurations by a material requirement planning and inventory management functions. This technique makes the "as designed" configuration definitions compatible with the implementation of "as built" configurations resulting in an integrated system of product configuration management from design engineering through manufacturing and shipment of end item configurations. Utilizing this technique the user will find it greatly efficient to detect the differences, if any, between "as designed" and "as built" end item configurations.

As an example, the "Var1" variation of assembly A for end item P1 uses component E and its effectivity starts form P1 serial number 121, as indicated in an engineering change affected item object. Component E is utilized in both "Conf1" and "ConfX" configurations. Planned order for component E is computed by extending the planned orders for "Var1" variation of assembly A and the quantity of E found in its associated bill of material. Detailed connections between component E requirements and end item P1 serial numbers are established by pointing to the appropriate entries in the Contract End Item effectivity object and the Contract End Item configuration object. A subsequent reassignment of serial numbers, including non-contiguous ranges of serial numbers for "Conf1" configuration will not impact the bill of material. These connections to end item serial numbers may be established at any level of bill of material.

With reference now to FIG. 11, there is illustrated an Engineering Change Notice which modifies the bill of material for an assembly utilized in a basic end item in accordance with the method and system of the present invention. As illustrated, an Engineering Change Notice ECC, as depicted at reference numeral 240 is set forth with the purpose of modifying the bill of material for assembly A for the basic end item P1 serial numbers 131 through 999. The modifications set forth is the replacing of basic component E by component G, quantity 2. This is a "time oriented" effectivity where Engineering Change Notice ECC for the basic end item configurations supersedes Engineering Change Notice ECA for the same configuration, starting at P1 serial number 131. Component E in the basic item A is replaced by component G with quantity 2.

As depicted within the engineering change affected item object at reference numeral 242, Engineering Change Notice ECC version of basic item E is assigned a design sequence number 8003, since the 8002 sequence was the highest sequence used so far for the basic item A and all variations of item A. In the bill of material, at reference numeral 244, component E is "extracted" by design sequence number 8003 and component G is "inserted" by the same design sequence number. Component F in the basic item A remains unextracted and therefore applicable to design sequence number 8003 corresponding to Engineering Change Notice ECC. This version of the basic item A is independent of the earlier replacement of component F for "Var1" variation of item A, corresponding to Engineering Change Notice ECB. Note that component E continues to be utilized in the "Var1" variation of item A, although E is replaced by G in the basic item A as set forth in the bill of material at reference numeral 244.

This technique illustrates the ability of the method and system of the present invention to assign time oriented end item serial number effectivity to the basic end item, independent of all customer contracted changes to the basic item, and to maintain successive versions of the basic item to support continued application of engineering changes to the basic end items where the basic item is utilized.

Finally, with reference to FIG. 12, there is illustrated an Engineering Change Notice which depicts a repeated customer order for an existing End Item Configuration after the basic end item has been changed during the intervening period in accordance with the method and system of the present invention. The purpose of Engineering Change Notice ECD as set forth at reference numeral 250, is to update item A "Var1" and item P1 "Conf1" for serial numbers 145 through 146. By the time of this engineering notice the basic configuration for end item P1 has changed. Thus, the "Var1" variation of item A should be modified to replace component E by component G. This represents a parallel version of "Var1" variation of item A where Engineering Change Notice ECD for "Var1" variation of item A supersedes Engineering Change Notice ECB for the same variation of item A. Engineering Change Notice ECD version of item A is assigned a design sequence number of 8004 as set forth within engineering change affected item object 252 since the 8003 sequence was the highest sequenced number utilized so far for the basic item A and all variations of item A. From the "Var1" variation of item A, component E is extracted by design sequence number 8004 and component G is "inserted" by the same design sequence number, as depicted in the bill of material object 254. For the "Var1" variation of item A, components Y and Z remain unextracted and therefore applicable to design sequence number 8004, corresponding to Engineering Change Notice ECD.

Engineering Change Notice ECD is also utilized to create a new version of the "Conf1" configuration of end item P1. This is necessitated by the fact that "Conf1" configuration will continue to use the back level version of "Var1" variation of item A until "Conf1" configuration is updated to use the latest changes to item A. This procedure is deliberately followed to ensure that the design engineers will technically evaluate the basic changes to the basic configuration before incorporating these changes to the customer contracted configurations.

Inclusion of the Engineering Change Notice ECD version of "Var1" variation of item A in the "Conf1" configuration of end item P1 is recorded in the End Item Configuration custom items object, as depicted at reference numeral 256. Engineering change level "ECB" for item A variation "Var1" is extracted and the engineering change level "ECD" for item A variation "Var1" is inserted in the "Conf1" configuration of end item P1.

The new effectivity information is then recorded in the Contract End Item configuration object and its subordinate end item effectivity object, shown combined at reference numeral 258. This object depicts the fact that the contract ABC-2, line 1, for end item P1 uses the End Item Configuration identifier "Conf1" and is effective for P1 serial numbers starting at 145 and ending at 146. This version control technique allows assignment of Contract End Item configuration effectivity to each unique customer specified End Item Configuration, distinct from the basic End Item Configuration, and maintain parallel versions of each such configuration to support continued application of customer contracted engineering changes to each such configuration. Those skilled in the art upon reference to the foregoing will appreciate that the above described techniques also illustrate the facility of the method and system of the present invention to allow multiple ranges of end item serial numbers to be assigned to a single unique End Item Configuration. Thus, implementation of the foundation for a comprehensive system of product configuration management may be accomplished utilizing the method and system of the present invention.

While the invention has been particularly shown and described with reference to a preferred embodiment, it will be understood by those skilled in the art that various changes in form and detail may be made therein without departing from the spirit and scope of the invention.

We claim:

1. A computer based method for product configuration management in the manufacture of a complex product having multiple diverse configurations, said method comprising the steps in a data processing system of:
   creating a plurality of end item configuration lists, each end item configuration list comprising a listing of custom components and variations of standard components utilized for a selected configuration of a complex product;
   creating a basic bill of materials comprising a listing of standard components utilized for all configurations of said complex products;
   establishing a relationship between a selected one of said plurality of end item configuration lists and a customer contract for manufacture of a particular configuration of said complex product;
   retrieving said selected one of said plurality of end item configuration lists and said basic bill of materials; and
   creating a complete bill of material utilizing said selected one of said plurality of end item configuration lists and said basic bill of materials to be utilized in the manufacture of said particular configuration of said complex product.

2. The computer based method for product configuration management in the manufacture of a complex product having multiple diverse configurations according to claim 1, further including the step of establishing a relationship between selected one of said plurality of end item configuration lists and a serial number for said complex product.

3. The computer based method for product configuration management in the manufacture of a complex product having multiple diverse configurations according to claim 2, wherein said relationship established between a selected one of said plurality of end item configuration lists and a serial number for said complex product is an indirect relationship wherein changes in serial number assignment may be made independently of said selected one of said plurality of end item configuration lists.

4. The computer based method for product configuration management in the manufacture of a complex product having multiple diverse configurations according to claim 1, further including the step of creating a unique end item configuration identifier for each of said plurality of end item configuration lists.

5. The computer based method for product configuration management in the manufacture of a complex product having multiple diverse configurations according to claim 4, further including the step of creating and maintaining an engineering change history associated with each unique end item configuration identifier independent of any engineering change history associated with another unique end item configuration identifier wherein engineering changes for a particular configuration of said complex product may be supported.

6. A data processing system for product configuration management in the manufacture of a complex product having multiple diverse configurations, said data processing system comprising:

means for creating a plurality of end item configuration lists, each end item configuration list comprising a listing of custom components and variations of standard components utilized for a selected configuration of a complex product;

means for creating a basic bill of materials comprising a listing of standard components utilized for all configurations of said complex product;

means for establishing a relationship between a selected one of said plurality of end item configuration lists and a customer contract for manufacture of a particular configuration of said complex product;

means for retrieving said selected one of said plurality of end item configuration lists and said basic bill of material; and means for creating a complete bill of material utilizing said selected one of said plurality of end item configuration lists and said basic bill of materials to be utilized in the manufacture of said particular configuration of said complex product.

7. The data processing system for product configuration management in the manufacture of a complex product having multiple diverse configurations according to claim 6, further including means for creating a unique end item configuration identifier for each of said plurality of end item configuration lists.

8. The data processing system for product configuration management in the manufacture of a complex product having multiple diverse configurations according to claim 7, further including means for creating and maintaining an engineering change history associated with each unique end item configuration identifier independent of any engineering change history associated with another unique end item configuration identifier wherein engineering changes for a particular configuration of said complex product may be supported.

* * * * *